US012624802B2

(12) United States Patent
Heo et al.

(10) Patent No.: US 12,624,802 B2
(45) Date of Patent: May 12, 2026

(54) PRESSURE VESSEL FIXING SYSTEM

(71) Applicant: DUKSAN AETHERCT CO., LTD., Busan (KR)

(72) Inventors: Seok-Bong Heo, Busan (KR); Jae-Sung Park, Busan (KR); Kyoung-Hun Kim, Busan (KR); Chang-Uk Lee, Busan (KR); Ho-Sun Wee, Busan (KR)

(73) Assignee: DUKSAN AETHERCT CO., LTD., Busan (KR)

( * ) Notice: Subject to any disclaimer, the term of this patent is extended or adjusted under 35 U.S.C. 154(b) by 56 days.

(21) Appl. No.: 18/633,616

(22) Filed: Apr. 12, 2024

(65) Prior Publication Data

US 2025/0137598 A1 May 1, 2025

(30) Foreign Application Priority Data

Nov. 1, 2023 (KR) ........................ 10-2023-0149307

(51) Int. Cl.
*F17C 13/08* (2006.01)

(52) U.S. Cl.
CPC ............ *F17C 13/084* (2013.01); *F17C 13/08* (2013.01); *F17C 2205/0153* (2013.01); *F17C 2221/011* (2013.01); *F17C 2221/012* (2013.01); *F17C 2221/014* (2013.01); *F17C 2221/033* (2013.01)

(58) Field of Classification Search
CPC .................... F17C 13/084; F17C 13/08; F17C 2205/0153; F17C 2221/011; F17C 2221/012; F17C 2221/014; F17C 2221/033; F17C 2201/0109; F17C 2201/035; F17C 2201/056; F17C 2201/058; F17C 2205/01; F17C 2205/0103
USPC .......................................................... 220/581
See application file for complete search history.

(56) References Cited

U.S. PATENT DOCUMENTS

| | | | | |
|---|---|---|---|---|
| 2003/0006349 | A1 | 1/2003 | Sadowski et al. | |
| 2010/0018591 | A1* | 1/2010 | Jauss | B60K 15/07 137/376 |
| 2017/0259026 | A1 | 9/2017 | Mair et al. | |
| 2024/0191843 | A1* | 6/2024 | Baer | F17C 13/084 |

FOREIGN PATENT DOCUMENTS

| | | | | |
|---|---|---|---|---|
| CN | 203130026 | U | | 8/2013 |
| DE | 102017010053 | A1 | * | 5/2019 |
| KR | 10-2009-0088055 | A | | 8/2009 |
| KR | 10-2021-0070473 | A | | 6/2021 |
| KR | 10-2022-0093707 | A | | 7/2022 |
| KR | 10-2432512 | B1 | | 8/2022 |
| KR | 102682239 | B1 | * | 7/2024 |
| WO | 2020243611 | A1 | | 3/2020 |
| WO | 2022086036 | A1 | | 4/2022 |
| WO | 2022145715 | A1 | | 7/2022 |
| WO | 2022218711 | A1 | | 10/2022 |
| WO | WO-2024137735 | A1 | * | 6/2024 |

OTHER PUBLICATIONS

English Machine Translation of DE-102017010053-A1 (Year: 2019).*
English Machine Translation of KR-102682239-B1 (Year: 2024).*

* cited by examiner

*Primary Examiner* — Laura E. Parker
(74) *Attorney, Agent, or Firm* — NKL LAW; Jae Youn Kim

(57) ABSTRACT

The present invention relates to a pressure vessel fixing system, which is a neck mount for fixing a pressure vessel used for storing various fluids.

6 Claims, 7 Drawing Sheets

PRESSURE VESSEL FIXING SYSTEM

BACKGROUND OF THE INVENTION

Field of the Invention

The present invention relates to a pressure vessel fixing system, and more specifically, to a pressure vessel fixing system which is a neck mount for fixing a pressure vessel used for storing various fluids such as oxygen, hydrogen, natural gas, and nitrogen to a facility to restrict the horizontal movement and rotation of the coupled pressure vessel, thereby preventing leakage of the stored fluid.

Background Art

A pressure vessel is used to store various fluids such as oxygen, hydrogen, natural gas, and nitrogen. As an example, the pressure vessel is used as a container for storing hydrogen, which is the fuel for environmentally friendly hydrogen electric vehicles.

Environmentally friendly hydrogen electric vehicles are vehicles powered by electric energy generated through the electrochemical reaction between hydrogen supplied from a high-pressure hydrogen tank and oxygen in the air within a fuel cell stack. It is important to transport or store hydrogen, which is a fuel used in such environmentally friendly hydrogen electric vehicles, in a compact and safe state. For this, among various methods, there is a method of converting gaseous hydrogen into liquid hydrogen or absorbing hydrogen into absorption alloys. However, currently, hydrogen tanks storing hydrogen in a lightweight and high-pressure tank (or cylinder) are used.

In this instance, to use a high-pressure hydrogen tank to an electric vehicle using a fuel cell, it is necessary to be stored in a compressed hydrogen state with high pressure of 350 bar or higher. However, if compressed hydrogen is stored below the pressure, when the high-pressure hydrogen tank is mounted in a vehicle, it can be disadvantageous in terms of practicality due to the need for securing a passenger space and securing a sufficient driving range due to the capacity of the high-pressure tank.

Meanwhile, in the conventional method of mounting the high-pressure hydrogen tank, namely, the pressure vessel, to a facility such as a vehicle, a pair of brackets are respectively fixed to frames forming a vehicle body, a seating plate curved downwardly is fixed and installed between the pair of brackets, and the pressure vessel is placed on the seating plate and is fixed to the seating plate by using fixing rings and bolts.

The pressure vessel fixed by the above method is significantly deformed by pressure increasing repeated pressurization and consumption of the stored hydrogen fuel, but a nozzle part of the pressure vessel is fixed only by the fixing rings and bolts. So, during vehicle operation, stress is concentrated on the nozzle part of the pressure vessel where the fixing rings and the bolts are in contact, and fine scratches are continuously generated due to the deformation of the pressure vessel and the friction caused by the deformation, thereby reducing the durability of the pressure vessel.

Furthermore, the pressure vessel is rotated or moved in the horizontal direction by vibration generated during vehicle operation and shock applied by collision, thus leading to hydrogen leakage and threatening stability.

PATENT LITERATURE

Patent Documents

Patent Document 1: Korean Patent Publication No. 10-2021-0070473 (published on Jun. 15, 2021)

SUMMARY OF THE INVENTION

Accordingly, the present invention has been made to solve the above-mentioned problems occurring in the prior arts, and it is an objective of the present invention to provide a pressure vessel fixing system, which when a pressure vessel is mounted on a facility, restricts the horizontal movement and rotation of the coupled pressure vessel due to vibration and shock transferred from the outside, thereby preventing leakage of stored hydrogen and enhancing stability.

It is an objective of the present invention to provide a pressure vessel fixing system, which includes a pair of pressurizing means getting in contact with a nozzle part of the vessel to firmly fix the nozzle part by pressurizing and fixing the nozzle part, wherein a distance between the pair of pressurizing means corresponds to the configuration of a displacement restricting part formed on the nozzle part so that at least one of the pressurizing means gets in contact with the displacement restricting part, thereby obtaining strong fixing force.

To accomplish the above object, according to the present invention, there is provided a pressure vessel fixing system including: a vessel having a displacement restricting part formed on the outer circumferential surface thereof to prevent positional displacement; a neck mount having a seating groove where the displacement restricting part is placed, and a pair of divided bodies coupled mutually; and pressurizing means coupled to the neck mount and each having a front end portion getting in contact with the displacement restricting part to pressurize and fix the displacement restricting part.

Moreover, the displacement restricting part is formed on the outer circumferential surface of the vessel, and includes a rotation restriction surface with a polygonal cross-section.

In this instance, the front end portion of the pressurizing means, which gets in contact with the displacement restricting part is deformed by being compressed to come into close contact with the displacement restricting part.

Furthermore, the pressurizing means are installed in pairs at spaced apart positions, and a distance between the pressurizing means is relatively longer or shorter than the length of one side of the rotation restriction surface.

Additionally, the cross section of the rotation restriction surface is formed as an equilateral polygon with all sides of equal length.

Furthermore, the displacement limiting portion includes a horizontal movement restriction groove formed inwardly from the outer circumferential surface of the vessel.

Additionally, the seating groove further includes a protrusion jaw inserted into the horizontal movement restriction groove.

In addition, the neck mount includes: a bottom block fixed to a facility; a top block coupled to the top surface of the bottom block; and fastening means integrally coupling the bottom block and the top block.

As described above, the pressure vessel fixing system according to the present invention can restrict the horizontal movement and rotation of the pressure vessel to prevent leakage of stored fluid, thereby enhancing stability.

Moreover, the pressure vessel fixing system according to the present invention can prevent the release of pressure at the fixed portion even when the fixed pressure vessel is in operation, i.e., undergoing deformation due to pressurization and consumption of stored gas, thereby obtaining strong fixing force.

Additionally, the pressure vessel fixing system according to the present invention includes the pair of pressurizing means, which are in contact with the displacement restricting part of the pressure vessel to pressurize and fix the displacement restricting part and are spaced apart from each other, wherein the distance between the pressurizing means is longer or shorter than the length of the contacting displacement restricting part and at least one of the pressurizing means is in contact with the displacement restricting part, thereby providing pressurizing and fixing force.

DETAILED DESCRIPTION OF THE PREFERRED EMBODIMENT

Hereinafter, a desirable embodiment of a pressure vessel fixing system according to the present invention will be described in detail with reference to the attached drawings.

First, a pressure vessel fixing system 1 according to the present invention is used when a pressure vessel storing fluids such as oxygen, hydrogen, natural gas, and nitrogen is mounted in a facility such as a vehicle or a transport cart. Hereinafter, an embodiment that a pressure vessel storing hydrogen is mounted in a vehicle will be described, but the present invention is not limited thereto.

Figure 1:
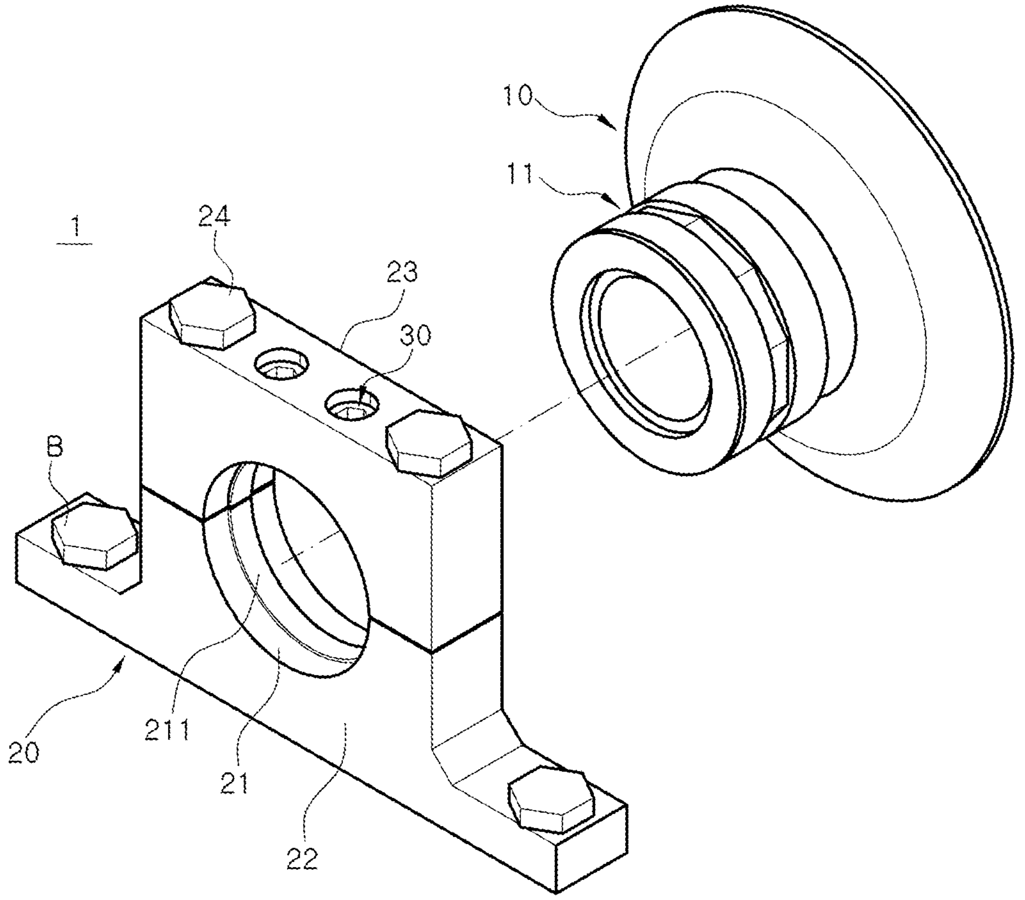
FIG. 1 illustrates an example of a pressure vessel fixing system according to the present invention.
Figure 2:
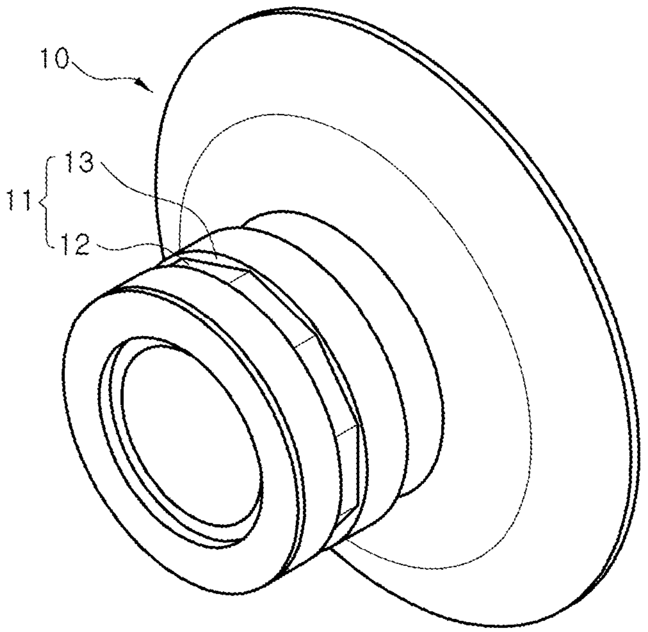
FIG. 2 illustrates an example of a vessel of the present invention.
Figure 3:
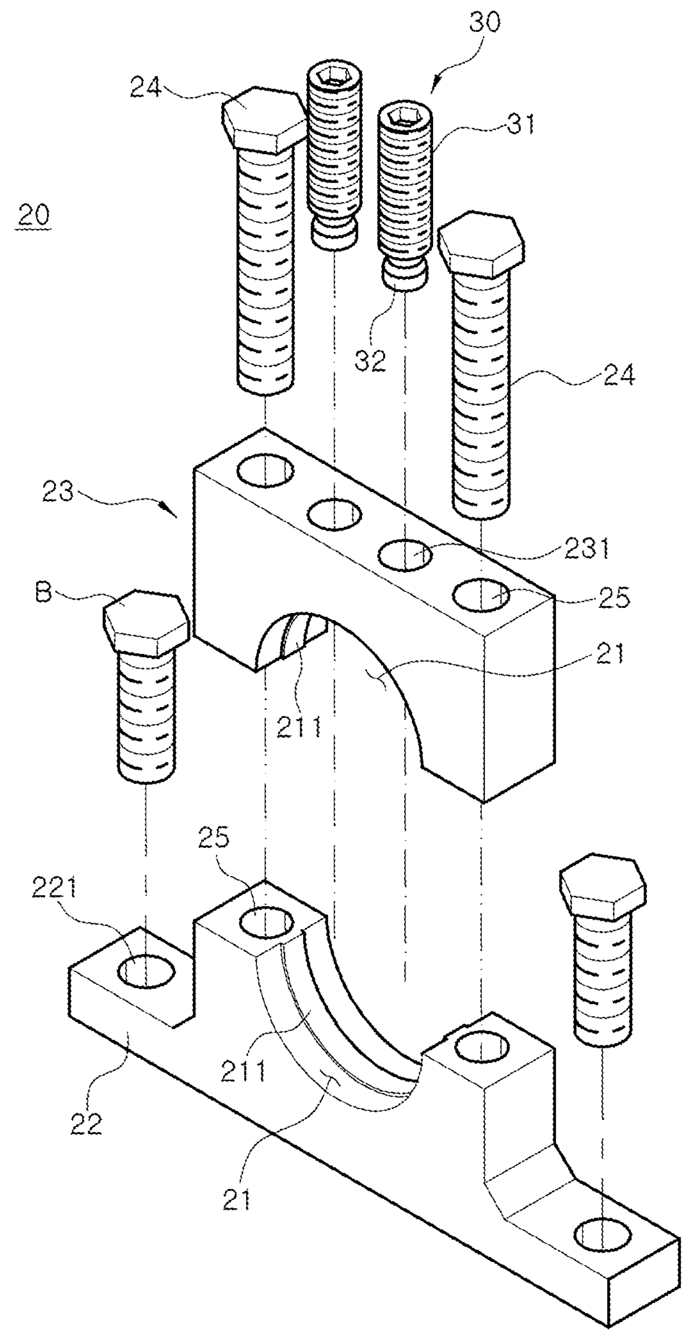
FIG. 3 is an exploded view of a neck mount of the present invention.
Figure 4:
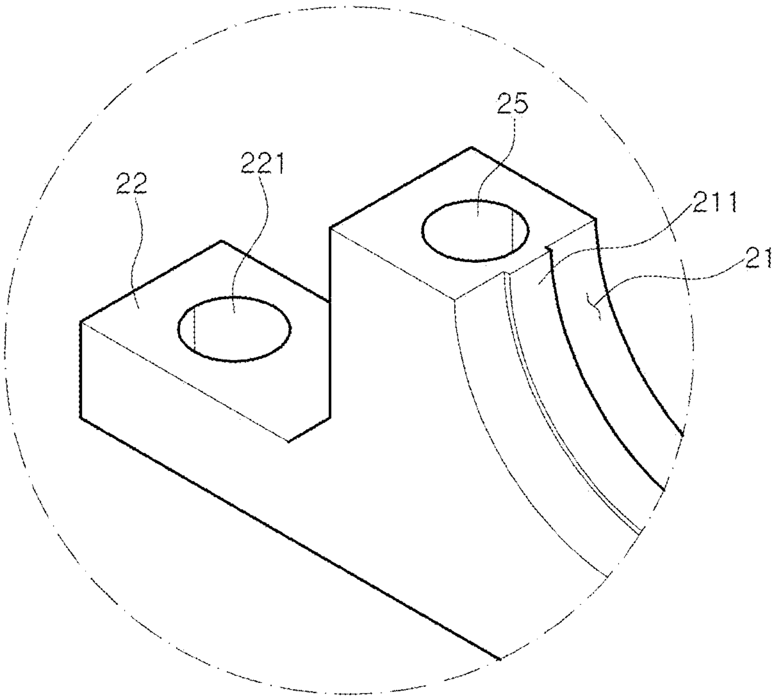
FIG. 4 is an enlarged view of a bottom block of the present invention.
Figure 5:
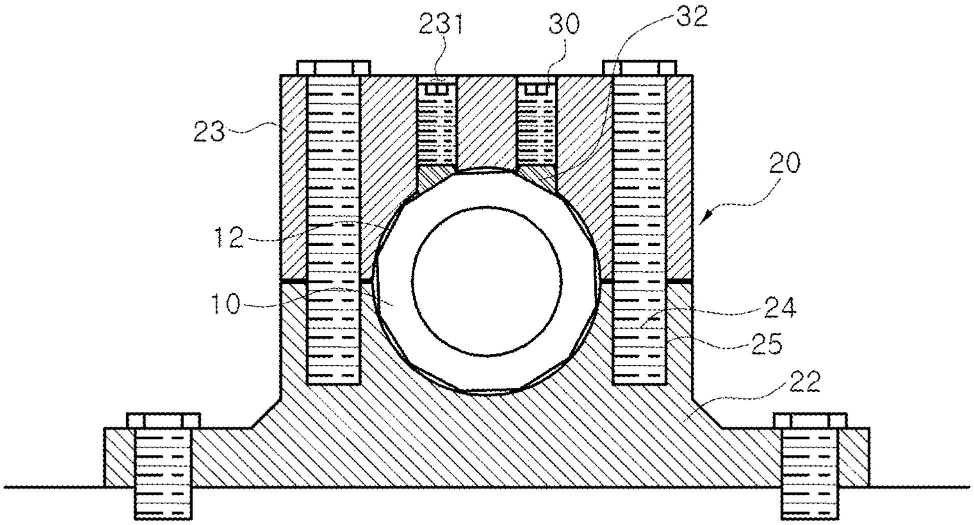
FIG. 5 is a sectional view illustrating a coupling state of the pressure vessel fixing system according to the present invention.
Figure 6:
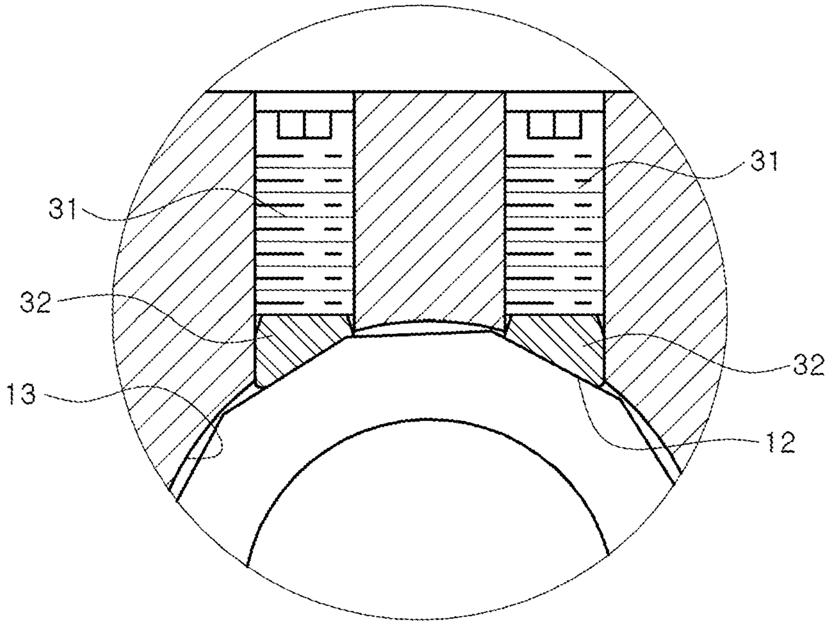
FIG. 6 is an enlarged view illustrating a state in which pressurizing means are in contact with a rotation restriction surface to pressurize the rotation restriction surface.
Figure 7:
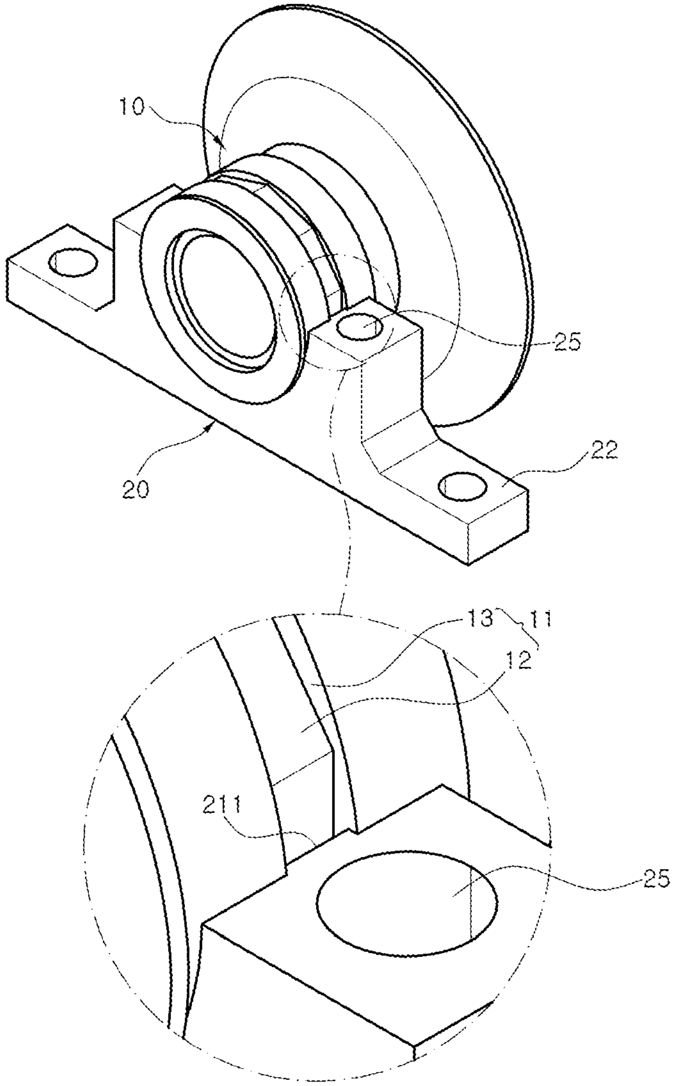
FIG. 7 is a view illustrating a state in which a protrusion jaw is inserted into a horizontal movement restriction groove.

As illustrated in FIGS. 1 to 3, the pressure vessel fixing system 1 according to the present invention includes: a vessel 10 having a displacement restricting part 11 formed on the outer circumferential surface thereof to prevent positional displacement; a neck mount 20 having a seating groove 21 where the displacement restricting part 11 is placed, and a pair of divided bodies coupled mutually; and pressurizing means 30 coupled to the neck mount 20 and each having a front end portion getting in contact with the displacement restricting part 11 to pressurize and fix the displacement restricting part 11.

The vessel 10 includes a liner made of synthetic resin or elastic polymer material. The liner includes a cylindrical portion with a hollow interior and a dome-shaped shoulder portion formed on both sides of the cylindrical portion to have a curved cross-section. The fluid is stored inside the liner.

Moreover, the displacement restricting part 11 is formed on the outer circumferential surface of one side of the shoulder portion, and the displacement restricting part 11 is formed to prevent horizontal movement and rotation of the shoulder portion and the liner.

The displacement restricting part 11 includes a rotation restriction surface 12 having a polygonal cross-section and a horizontal movement restriction groove 13 formed inwardly on the outer circumferential surface thereof.

First, the rotation restriction surface 12 has a polygonal cross section, wherein an outwardly exposed surface is formed flat to be pressurized and fixed by getting in contact with the pressurizing means 30, thereby restricting the horizontal movement and the rotation.

In this instance, the rotation restriction surface 12 is preferably formed as an equilateral polygon with all sides of equal length, and the number of the sides can vary according to the outer diameter of the shoulder portion, so the number of the sides are not limited to the number illustrated in the drawings.

When the pressurizing means 30 are tightened to the surface of the rotation restriction surface 12 exposed to the outside, the rotation restriction surface 12 is pressurized and fixed while the front end portions of the pressurizing means 30 get in contact with the rotation restriction surface 12, thereby preventing the horizontal movement and the rotation of the vessel due to the operation of the fluid and external shock.

The horizontal movement restriction groove 13 restricts horizontal movement of the vessel. It is advantageous for the pressurizing means 30, which pressurizes and fixes the rotation restriction surface 12, to restrict the rotation by providing pressure from top to bottom, but the pressurizing means 30 is relatively weak in pressure to restrict the horizontal movement, so the horizontal movement restriction groove 13 assists in restricting the horizontal movement.

For this, the horizontal movement restriction groove 13 is formed to be recessed inwardly from the outer circumferential surface of the shoulder portion, and a protrusion jaw 211, which is formed formed on a bottom block 22 of the neck mount 20, is inserted into the horizontal movement restriction groove 13 to restrict the horizontal movement by the inserted protrusion jaw 211.

Here, as illustrated in the drawings, the rotation restriction surface 12 may be formed on the inner surface of the horizontal movement restriction groove 13, and alternatively, the rotation restriction surface 12 and the horizontal movement restriction groove 13 may be separately formed at different locations in another embodiment.

The neck mount 20 includes a seating groove 21 where the displacement restricting part 11 is placed, and a pair of divided bodies coupled mutually, wherein the neck mount 20 further includes a bottom block 22 fixed to the facility, a top block 23 coupled to the upper surface of the bottom block 22, and a fastening means 24 that integrally couples the bottom block 22 and the top block 23.

The bottom block 22 and the top block 23 each have a seating groove 21 formed. The seating groove 21 is formed in each block in a semi-circular shape. When the bottom block 22 and the top block 23 face each other, the seating grooves 21 form a circular shape.

That is, the bottom block 22 has a semi-circular groove with an open top, and the top block 23 has a groove with an open bottom, so that when the bottom block and the top block are matched, a circular seating hole is provided, so the displacement restricting part 11 of the vessel 10 is placed in the circular seating hole 21.

The fastening means 24 is intended to integrally fix the bottom block 22 and the top block 23. In the drawings, it is illustrated that a coupling bolt B with a coupling spiral formed on the outer circumferential surface is provided to be screw-coupled to coupling holes 25 of the blocks, but various modifications are possible for integrally fixing a pair of pieces.

Additionally, the bottom block 22 has a fastening hole 221 to which the coupling bolt B for fixing the vessel to a facility, such as a car trunk or a transport cart, is coupled.

Meanwhile, the top block 23 has a pressurizing hole 231 formed to penetrate through the top block 23 vertically, and the pressurizing means 30 engages the pressurizing hole 231. Here a pair of the pressurizing holes 231 are formed to be spaced apart from each other, and each pressurizing means 30 engages each pressurizing hole 231.

Meanwhile, the seating groove 21 further includes a protrusion jaw 211 inserted into the horizontal movement restriction grooves 13. The protrusion jaw 211 protrudes toward the center of the seating groove from the inner surface of the seating groove 21, and then, is inserted into the horizontal movement restriction grooves 13 of the placed vessel 10.

As illustrated, the protrusion jaws 211 may be continuously formed on the inner surface of the seating groove 21, or alternatively, may be radially provided at predetermined intervals as another embodiment.

Moreover, the protrusion height of the protrusion jaw 211 is set such that when the rotation restriction surface 12 is formed on the inner surface of the horizontal movement restriction grooves 13, the protrusion jaw 211 is not in contact with the rotation restriction surface 12.

In other words, in the state in which the displacement restricting part 11 is placed in the seating groove 21, when it is necessary to rotate the vessel before fixing the position, the height of the protrusion jaw 211 is set not to interrupt the rotation by preventing touching between the protrusion jaw 211 and the rotation restriction surface 12.

The pressurizing means 30 is coupled to the neck mount 20, and the front end portion of the pressurizing means 30 gets in contact with the displacement restricting part 11 to pressurize and fix the displacement restricting part 11. The pair of the pressurizing means 30 are spaced apart from each other, and get in contact with the rotation restriction surface 12 at the spaced positions to pressurize the rotation restriction surface 12.

Here, the pressurizing means 30 includes a body 31 with a spiral thread for lifting and lowering formed on the outer circumferential surface and a press pin 32 located at the bottom of the body 31 to get in contact with the rotation restriction surface 12.

In this case, the body 31 and the press pin 32 are each made of a metal material with predetermined strength, wherein the press pin 32 is made of metal with relatively weaker strength compared to the body 31.

Thus, when the body 31 is continuously lowered after the front end portion of the press pin 32 gets in contact with the rotation restriction surface 12 by the descent of the body 31, the body 31 is pressed against the rotation restriction surface 12 and the body 31 and the rotation restriction surface 12 get in contact with each other over a wide area, so that the pressurization transferred from the body 31 is provided to the wide area of the rotation restriction surface 12, thereby enhancing the effect of restricting rotation and horizontal movement.

Meanwhile, the pair of pressurizing means 30 are provided at spaced apart positions, wherein the distance between the pair of pressurizing means 30 is relatively longer or shorter than the length of one side of the rotation restriction surface 12. In other words, the distance between the pair of pressurizing means 30 is not the same as the length of one side of the rotation restriction surface 12.

As described above, the rotation restriction surface 12 is formed as a polygonal shape in cross section, and to change the angle of the vessel as occasion demands, when the rotation restriction surface 12 is rotated and then fixed in the rotated position, if the contact position of the pressurizing means 30 is the edge where the sides meet, since the pressurizing means 30 and the rotation restriction surface 12 are in contact with each other in a line contact form, pressure is not transferred properly and the effect of restricting horizontal movement and rotation cannot be achieved.

To address the problems, the pressurizing means 30 are provided in pairs at spaced apart positions and the distance between the pressurizing means 30 is formed to be relatively longer or shorter than the length of one side of the rotation restriction surface 12 such that at least one of the pair of the pressurizing means 30 gets in contact with the side of the rotation restriction surface, thereby allowing proper transfer of pressurizing force.

Meanwhile, it is desirable for the rotation restriction surface 12 to be formed as an equilateral polygon with all sides of equal length.

That is, even though the rotation restriction surface 12 is oriented in any direction, at least one of the pair of pressurizing means 30 gets in contact with the side.

As described above, although specific components, limited embodiments and drawings of the present invention have been described herein to facilitate a better understanding of the invention, it should be understood that the present invention is not limited to the embodiments and various modifications and changes can be made by those skilled in the art to which the invention pertains, based on the disclosure provided herein.

Therefore, the scope of the invention should not be limited to the described embodiments, and not only the scope of the claims but also equivalents thereof should be considered to be within the scope of the invention.

What is claimed is:

1. A pressure vessel fixation system comprising:

a vessel having a displacement restricting part disposed on an outer circumferential surface thereof to prevent positional displacement;

a neck mount having a seating groove where the displacement restricting part is placed; and pressurizing means coupled to the neck mount and configured to pressurize and fix the displacement restricting part, wherein the displacement restricting part includes a rotation restriction surface having a polygonal cross-section, wherein the neck mount includes a bottom block and a top block that are separated from each other and mutually coupled by a fastener, wherein the pressurizing means include a body with a spiral thread and a press pin disposed at a bottom of the body and configured to contact the rotation restriction surface, wherein the press pin is made of a metal having a lower strength than the body, and wherein the press pin is deformed under a compressive force generated when the body is descended and comes into contact with the rotation restriction surface.

2. The pressure vessel fixation system according to claim 1, wherein the pressurizing means are installed in a pair at spaced apart positions, and a distance between the pressurizing means is greater than or less than a length of one side of the rotation restriction surface.

3. The pressure vessel fixation system according to claim 1, wherein the polygonal cross-section is an equilateral polygon with all sides of equal length.

4. The pressure vessel fixation system according to claim 1, wherein the displacement restricting part includes a horizontal movement restriction groove disposed inwardly from the outer circumferential surface of the vessel.

5. The pressure vessel fixation system according to claim 4, wherein the seating groove further includes a protrusion jaw inserted into the horizontal movement restriction groove.

6. The pressure vessel fixation system according to claim 1, wherein:

the bottom block is fixed to a facility;

the top block is coupled to a top surface of the bottom block; and the fastener is configured to couple the bottom block and the top block, wherein the fastener includes a bolt screw coupled to coupling holes of the bottom block and the top block.

* * * * *